(12) United States Patent
Furuichi et al.

(10) Patent No.: US 7,600,231 B2
(45) Date of Patent: Oct. 6, 2009

(54) CONTROL METHOD FOR CONTROLLING AN APPLICATION PROGRAM

(75) Inventors: Sanehiro Furuichi, Tokyo (JP); Masana Murase, Yokohama (JP); Tasuku Otani, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/510,970

(22) Filed: Aug. 28, 2006

(65) Prior Publication Data

US 2007/0050781 A1    Mar. 1, 2007

(30) Foreign Application Priority Data

Aug. 30, 2005    (JP) .............................. 2005-249157

(51) Int. Cl.
  G06F 9/44      (2006.01)
  G06F 15/167    (2006.01)

(52) U.S. Cl. ................... 719/312; 719/313; 709/213

(58) Field of Classification Search ............... 719/310, 719/312, 313, 319, 320; 709/213, 224; 715/724, 715/769, 770; 711/147, 148
See application file for complete search history.

(56) References Cited

U.S. PATENT DOCUMENTS

| | | | | |
|---|---|---|---|---|
| 5,956,514 | A * | 9/1999 | Wen et al. .................... | 717/127 |
| 7,047,498 | B2 * | 5/2006 | Lui et al. ..................... | 715/762 |
| 7,299,413 | B2 * | 11/2007 | Mori .......................... | 715/255 |
| 7,437,617 | B2 * | 10/2008 | Al-Omari et al. ............. | 714/45 |
| 7,478,204 | B2 * | 1/2009 | McKenney et al. ......... | 711/151 |
| 7,484,245 | B1 * | 1/2009 | Friedman et al. ............. | 726/27 |
| 2002/0099837 | A1 * | 7/2002 | Oe et al. ..................... | 709/229 |
| 2005/0028168 | A1 * | 2/2005 | Marcjan ..................... | 719/315 |

FOREIGN PATENT DOCUMENTS

| | | |
|---|---|---|
| JP | 10293769 A2 | 11/1998 |
| JP | 20194799 A2 | 7/2000 |
| JP | 21350671 A2 | 12/2001 |
| JP | 2002-288030 | 4/2002 |
| JP | 2003-044297 | 2/2003 |

(Continued)

OTHER PUBLICATIONS

Joseph et al. "Program-Level Control of Network Delay for Parallel Asynchronous Iterative Applications", 1996 IEEE, pp. 88-93.*

(Continued)

*Primary Examiner*—Van H Nguyen
(74) *Attorney, Agent, or Firm*—Shimokaji & Associates, P.C.; Grant A. Johnson

(57) ABSTRACT

An information processing apparatus that concurrently executes a plurality of application programs including first and second application programs on an operating system. The information processing apparatus monitors a function call from the first application program to the operating system or a message being sent and received between the first application program and the operating system. Then, based on the monitoring result, the information processing apparatus modifies or inhibits a function call from the second application program to the operating system or a process for sending and receiving a message between the second application program and the operating system. In this way, embodiments of the present invention control operations of the application program without modifying the existing operating system.

1 Claim, 14 Drawing Sheets

FOREIGN PATENT DOCUMENTS

WO 2004/066156 A1 8/2004

OTHER PUBLICATIONS

Zhou "On the Monitoring of Remote Procedure Call Programs", 1990 IEEE, pp. 141-145.*
Sarukkai et al. "Monitoring Data-Structure Evolution in Distributed Message-Passing Programs", 1996 IEEE, pp. 311-319.*
Washio, et al, "A Proposal of a Usage Control Method that Utilizes a Propagation of Document Attributes", Mar. 23, 2005.
Aoyagi, et al, "Secret Information File Sealing System", Oct. 14, 2002.
Yamazaki, Youichi; "Prevention Tool for illegal copy of web contents", "Disable copy operation in browser", Large difference in time-consumption at the time of installation, Nikkei Internet Solutions, Jul. 2003, pp. 96-103; Internet Solutions, Jul. 2003; Synthesize NEC.
Ohmori, Toshiyuki; "Cutting off 'the source' of information outflow", Cryptographic software market taking off, Close Up, pp. 148-153; Nikkei Computer, Dec. 1, 2003.

* cited by examiner

FIG. 2A

| DATA | App. ID | CALLING FREQUENCY | DATA SIZE | ELECTRONIC SIGNATURE |
|---|---|---|---|---|
| DATA.doc <br> [FOR INTERNAL USE ONLY] <br> O×INC. BUSINESS RESULTS DATA <br> (DIGITAL WATERMARK) | 3415 | 15 | 5MB | DATA.sig |

| RUNNING APPLICATION |
|---|
| 3415 |
| 2642 |
| 3435 |
| ... |

CONTROL METHOD FOR CONTROLLING AN APPLICATION PROGRAM

FIELD OF THE INVENTION

The present invention relates to a control method of an application program and an apparatus therefor. More particularly, the present invention relates to a control method for controlling a function call from an application program to an operating system and an apparatus therefor.

BACKGROUND

Conventionally, an operating system controls operations of an application program based on information set by a system administrator. For example, the operating system inhibits access to a specific file according to the authority of a user who activates the application program. Moreover, the operating system determines computation time of a CPU to be assigned to each application program.

However, the control by the operating system is limited to types predetermined by a designer of the operating system. For this reason, in order to realize control different from the operating system, it was necessary to remodel the existing application program or to remodel the operating system. Although it is assumed that the program or system has been remodeled, there has been a problem that the remodeling requires enormous development time and development cost and further reduces maintenance performance of program.

In this regard, a technique for expanding access control functions to a file without remodeling the existing operating system has been conventionally proposed as disclosed, for example, in Japanese Patent Application Publication No. 2003-44297. An application program according to this technique sends operation requests to the operating system via a resource managing program. When the resource managing program catches the operation request, the resource managing program specifies a computer resource designated by the operation request and decides whether the application program has access permission to the resource. If the application program does not have access permission, the resource managing program refuses the operation request. According to this technique, although access is permitted by the operating system, it is possible to prescribe independent access permission independently of permission by the operating system.

According to the technique, in association with a set of a user and a computer resource, it is determined whether the access to the resource is permitted. Whether access to a resource is permitted is statically determined by an administrator or the like. For this reason, it was not possible to modify whether access is permitted or not based on information varying with the advance of a process of a program. For example, access to certain data could not be permitted or inhibited based on the contents and attribute of the data or which application program holds and uses the data at present.

SUMMARY

Embodiments of the present invention provide control operations of an application program in more detail than ever before without modifying the existing operating system. According to a first aspect of the present invention, there is provided an information processing apparatus that concurrently executes a plurality of application programs including first and second application programs on an operating system, a control method of the information processing apparatus, and a program for controlling the information processing apparatus. The information processing apparatus includes: a monitoring component that monitors a function call from the first application program to the operating system or a message being sent and received between the first application program and the operating system; and a control component that modifies or inhibits a function call from the second application program to the operating system or a process for sending and receiving a message between the second application program and the operating system based on a monitoring result by the monitoring component.

According to a second aspect of the present invention, there is provided a method to be applied to an information processing apparatus for executing a higher-level program providing a higher-level function and first and second lower-level programs each providing first and second lower-level functions. The method includes the step of: calling the higher-level function to realize the first lower-level function; calling the higher-level function to realize the second lower-level function; judging a combination of the first and second lower-level functions; and inhibiting the call for the higher-level function on condition that the combination of the first and second lower-level functions is a predetermined combination.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIGS. 2A and 2B are views exemplary showing data structure of a shared memory space;

DETAILED DESCRIPTION

The invention will now be described based on the preferred embodiments, which do not intend to limit the scope of the present invention, but exemplify the invention. All of the features and the combinations thereof described in the embodiment are not necessarily essential to the invention.

Figure 1:
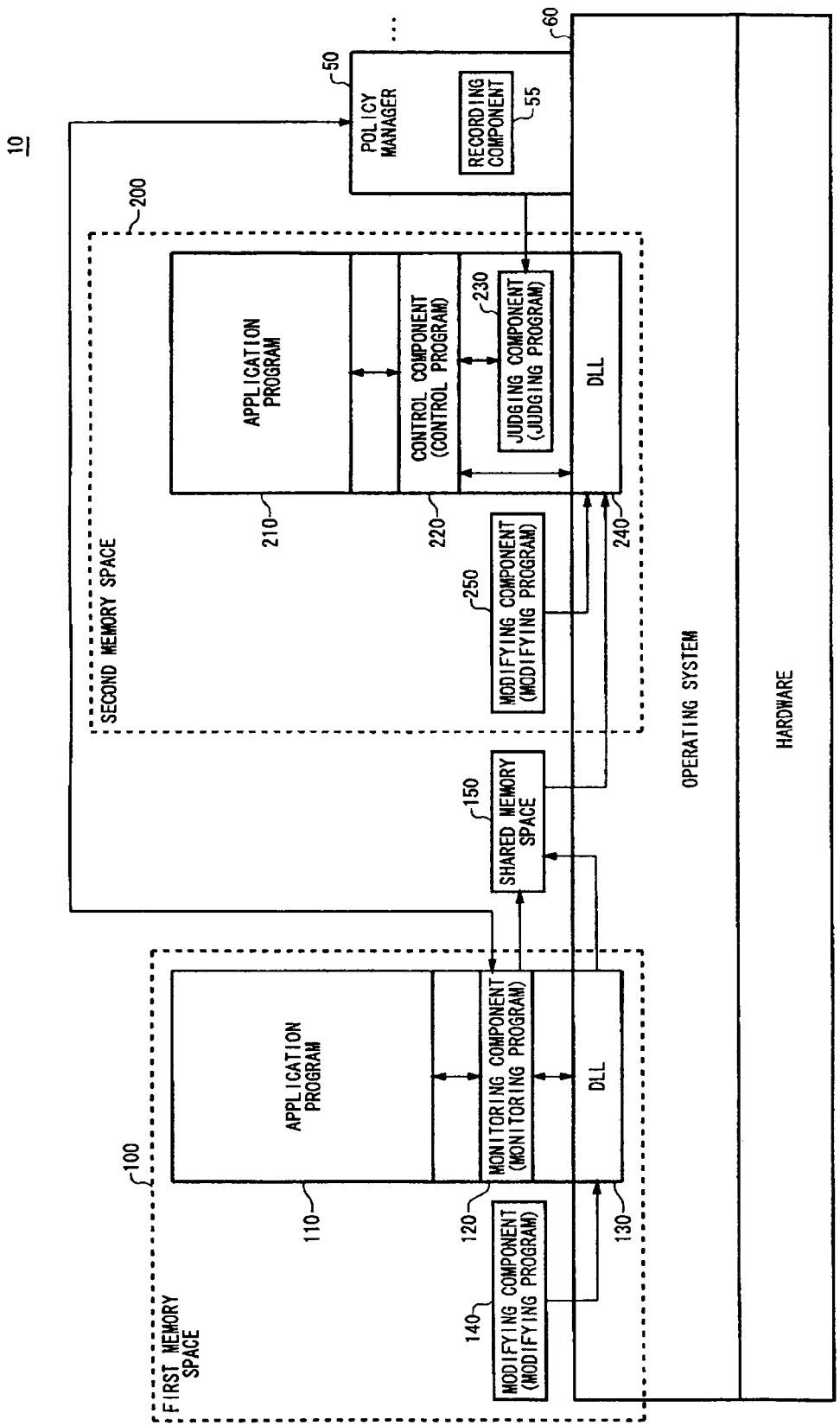
FIG. 1 is a view showing a configuration of an information processing apparatus.

FIG. 1 is a view showing a configuration of an information processing apparatus 10. The information processing apparatus 10 operates an operating system 60 as an example of a higher-level program that provides higher-level functions according to the present invention. Then, the information processing apparatus 10 operates a plurality of application programs in parallel on the operating system 60. Specifically, the information processing apparatus 10 operates a first application program that is an example of a first lower-level program providing a first lower-level function in a first memory space 100. It is assumed that this program is an application program 110. Moreover, the information processing apparatus 10 operates a second application program that is an example of a second lower-level program providing a second lower-level function in a second memory space 200. It is assumed that this program is an application program 210. An object of the information processing apparatus 10 according to the present embodiment is to monitor a function call from the application program 110 to the operating system 60 and control operations of the application program 210 based on the monitoring result.

Hereinafter, in the present embodiment, there is representatively described a function for controlling operations of the application program 210 based on the monitoring results obtained by monitoring function calls of the application program 110. Additionally, the information processing apparatus 10 may further control operations of the application program 110 based on the monitoring results obtained by monitoring function calls of the application program 210. In this case, the information processing apparatus 10 further operates a monitoring component 120 and a modifying component 140 in the second memory space 200 and further operates a control component 220, a judging component 230, and a modifying component 250 in the first memory space 100. Since a function of each member added in this way is the same as that of each member in FIG. 1, its description will be omitted.

The information processing apparatus 10 has the first memory space 100, a shared memory space 150, and the second memory space 200 in a memory 1020 to be described below. The information processing apparatus 10 operates the application program 110, the monitoring component 120, a DLL 130, and the modifying component 140 in the first memory space 100. The modifying component 140 modifies a call destination address of a function call from the application program 110 to the operating system 60 to an address of a monitoring program realizing the monitoring component 120 according to an operation start of the application program 110. The modified call destination address is a call destination address of a function predetermined as an object monitoring processing matter, among a plurality of functions to be provided by the operating system 60. The predetermined function is provided as the DLL 130 by the operating system 60.

The monitoring component 120 is realized by a monitoring program operating along with the application program 110 on the first memory space 100. Then, the monitoring component 120 monitors a function call from the application program 110 to the operating system 60 or a message being sent and received between the application program 110 and the operating system 60, and records the monitoring result in the shared memory space 150. In detail, the monitoring component 120 is called from the application program 110 to start a process, records an argument or a return value of the function call in the shared memory space 150 as the monitoring result, and executes a function call for the DLL 130 by the argument.

Alternatively, the monitoring component 120 may transfer the monitoring result to the DLL 130 as an argument or the like, and record the result in the shared memory space 150 via the DLL 130. The DLL 130 is called from the monitoring component 120 to start a process, which is predetermined by the argument designated by the monitoring component 120, and returns the processing result to the monitoring component 120 as a return value. Moreover, the DLL 130 may record data according to the contents of the process in the shared memory space 150. For example, when a function copying data into a clipboard is called, the DLL 130 records the data in the shared memory space 150 and the monitoring component 120 records identification information of the application program 110 in the shared memory space 150.

The information processing apparatus 10 operates the application program 210, the control component 220, the judging component 230, and a DLL 240 in the second memory space 200. The modifying component 250 modifies a call destination address of a function call from the application program 210 to the operating system 60 to an address of a control program realizing the control component 220 according to an operation start of the application program 210. The modified call destination address is a call destination address of a function predetermined as an object controlling a process, among the plurality of functions to be provided by the operating system 60. The predetermined function is provided as the DLL 240 by the operating system 60.

The control component 220 is realized by a control program operating along with the application program 210 on the second memory space 200. Then, the control component 220 modifies or inhibits a function call from the application program 210 to the operating system 60 or a process for sending and receiving a message between the application program 210 and the operating system 60, based on the monitoring result by the monitoring component 120. In detail, the control component 220 starts a process called from the application program 210, reads the monitoring result from the shared memory space 150, and executes a function call for the operating system 60 by means of an argument different from the called argument or returns the process to the application program 210 without executing that function call based on the read monitoring result.

In reality, the monitoring result may be transferred to the control component 220 by the DLL 240 as a return value, that is, may be transferred from the shared memory space 150 to the control component 220 via the DLL 240. In this case, the control component 220 may acquire the monitoring result from the shared memory space 150 by calling a function in the judging component 230, in order to judge whether the function call called from the application program 210 is executed based on the acquired monitoring result.

The judging component 230 judges whether a function call by the control component 220 or sending and receiving of messages should be inhibited based on the monitoring result recorded in the shared memory space 150. For example, the judging component 230 may judge that the function call or the sending and receiving of messages is inhibited on condition that an application program identified by identification information acquired from a policy manager 50 is a predetermined specific application program.

The policy manager 50 operates in a memory space different from the first memory space 100 and the second memory space 200, and has a recording component 55. The recording component 55 records various types of information to control processes of application programs. The policy manager 50 controls the monitoring component 120 and the DLL 130 based on the information recorded on the recording section 55. For example, the recording section 55 may record a set of copy source and copy destination application programs for which the copy of data is inhibited. Then, the policy manager 50 provides information showing a set of the application programs to the judging component 230.

FIGS. 2A and 2B are views exemplary showing data structure of the shared memory space 150. The shared memory space 150 is an example of a shared memory space according to the present invention, and also plays a role as a control memory space according to the present invention. That is to say, either of the application program 110 or the application program 210 can access the shared memory space 150, and further either of the monitoring component 120 or the control component 220 can access the shared memory space 150.

Specifically, as shown in FIG. 2A, the shared memory space 150 stores the monitoring result by the monitoring component 120 in association with the data acquired from the application program 110. For example, when the monitoring component 120 has detected a function call through which the application program 110 records data in the shared memory space 150, the monitoring component 120 may record identification information identifying the application program 110 in the shared memory space 150 as a monitoring result in association with the data. In this case, in the shared memory space 150, the identification information of the application program 110 is recorded as a monitoring result. Here, identification information of an application program is a number to distinguish the application program from other application programs. For example, identification information of a word processor is "3415", and identification information of a computer aided design (CAD) application program is "3435".

Moreover, when the monitoring section 120 has detected a function call through which the application program 110 records data in the shared memory space 150, the monitoring component 120 may record an electronic signature authenticating that the data has been recorded by the application program 110, in association with the data, or may encode the data. In this case, in the shared memory space 150, the electronic signature or the encoded data is recorded as a monitoring result. Moreover, when the monitoring component 120 has detected a function call through which the application program 110 records data in the shared memory space 150, the monitoring component 120 may record the number of times of the function call in association with the data. In this case, in the shared memory space 150, the number of times is recorded as a monitoring result. The number of times of a function call is, e.g., the number of times by which the function is called in a predetermined period traced back from the current time. For example, if the function has been called 15 times for the past 15 minutes, "15" that is the number of times is recorded.

Moreover, when the monitoring component 120 has detected a function call through which the application program 110 records data in the shared memory space 150, the monitoring component 120 may record the size of the data in association with the data. In this case, in the shared memory space 150, the size of the data is recorded as a monitoring result. The size of data is the size of data recorded in the shared memory space 150 by the function call. Alternatively, the size of data may be the total size of data that has been recorded over multiple times in the past predetermined period.

Furthermore, when the monitoring component 120 has detected a function call through which the application program 110 records data in the shared memory space 150, the monitoring component 120 may add, to the data, a digital watermark showing that the data has been copied from the application program 110. In this way, although the data is copied into another application program, it is possible to know the source of the data.

Moreover, as shown in FIG. 2B, the shared memory space 150 may record identification information of an application program that is now running on the operating system 60. This identification information is managed by a monitoring component 320 to be described below. For example, the monitoring component 320 may detect a call of a function starting an application program to record identification information of the application program started by the function in the shared memory space 150 as a monitoring result. Moreover, the monitoring component 320 may detect a call of a function terminating an application program to delete identification information of the application program terminated by that function from that monitoring result.

In addition, the shared memory space 150 may record the various types of monitoring results as a file, or may record the results as data such as a numeric value of a variable. Moreover, the shared memory space 150 may include a monitoring result in a data file to record the file. Moreover, the shared memory space 150 may be an area that is accessible from either of the application program 110 or the monitoring component 120, or may be provided in a recording medium such as a hard disk drive or a magneto-optical disk in addition to a main memory.

Figures 3A, 3B:
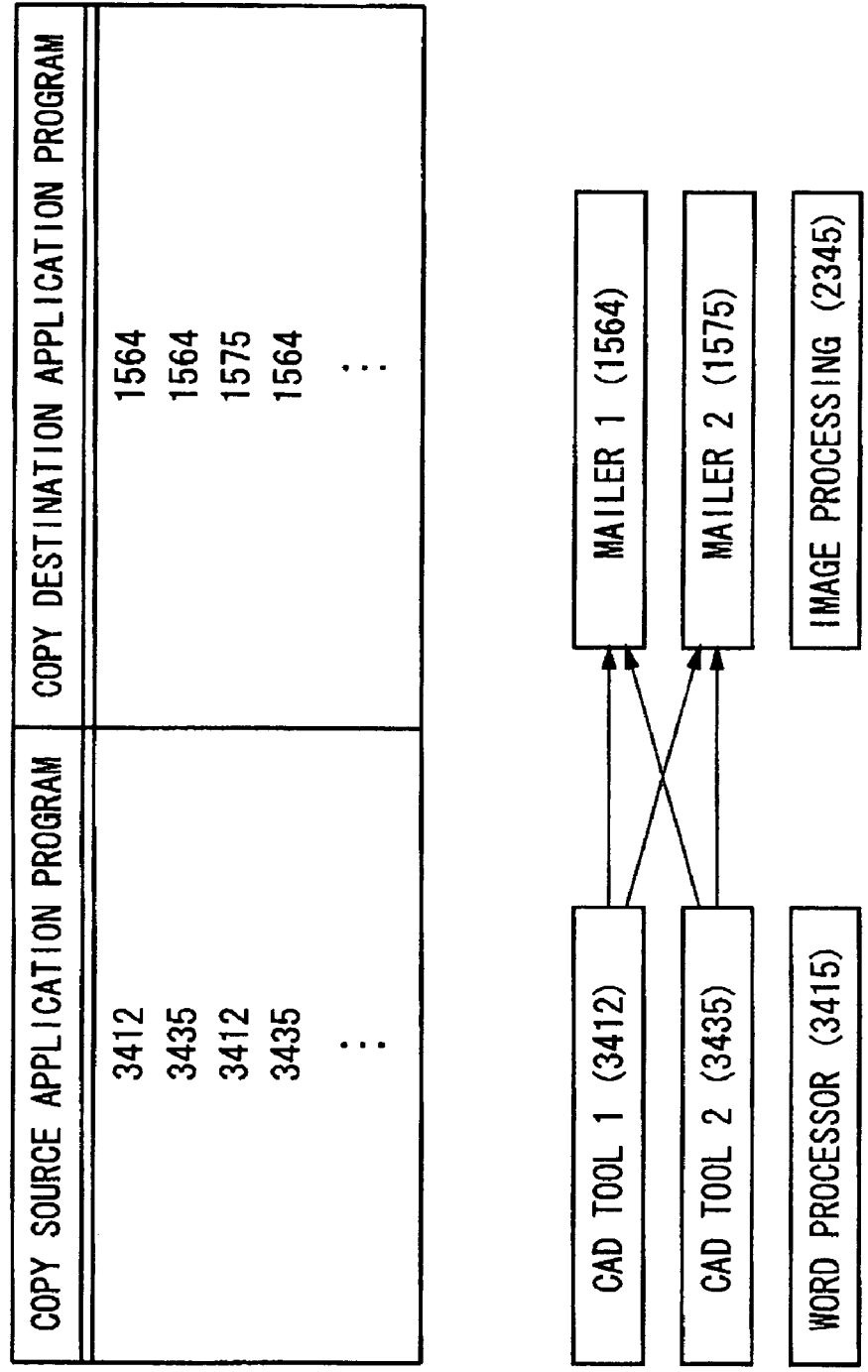
FIGS. 3A and 3B are views exemplary showing data structure of a recording section.

FIGS. 3A and 3B are views exemplary showing data structure of the recording section 55. As shown in FIG. 3A, the recording section 55 records a set of copy source and copy destination application programs for which the copy of data is inhibited. That is to say, as shown in FIG. 3B, a copy of data from a CAD tool 1 of which identification information is 3412 to a mailer 1 of which identification information is 1564 is inhibited (see an arrow in the present drawing). On the other hand, a copy of data from a word processor of which an identification number is 3415 to the mailer 1 of which an identification number is 1564 is permitted.

Figure 4:
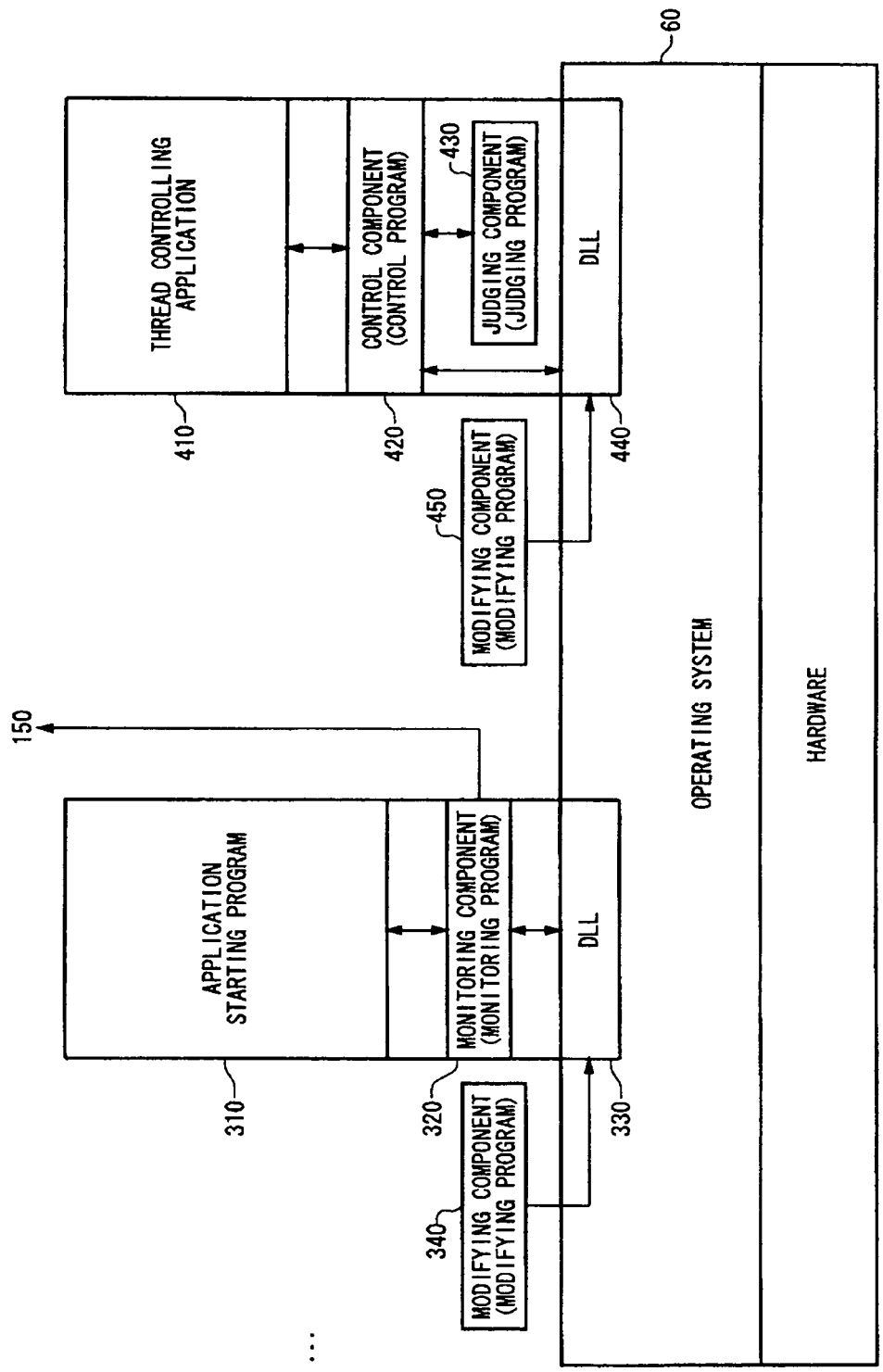
FIG. 4 is a view showing a configuration of programs to be further operated by an information processing apparatus.

FIG. 4 is a view showing a configuration of programs to be further operated by the information processing apparatus 10. The information processing apparatus 10 further operates an application starting program 310, a monitoring component 320, a DLL 330, and a modifying component 340. The modifying component 340 modifies a call destination address of a function call from the application starting program 310 to the DLL 330 to an address of a monitoring program realizing the monitoring component 320. The application starting program 310 is a starting program for starting other application programs. When a user instructs the program to start an application program, the application starting program 310 calls a function in the operating system 60, which starts the application program. This function is provided by the DLL 330 in the operating system 60.

The monitoring component 320 detects a call of a function starting an application program to record identification information of the application program started by that function in the shared memory space 150 as a monitoring result. Specifically, the monitoring component 320 is called from the application starting program 310 to start a process, and acquires the identification information from an argument of the function call to record the information in the shared memory space 150. Then, the monitoring component 320 calls a function in the DLL 330 by means of the argument. The DLL 330 is called from the monitoring component 320 to start a process, and starts an application program.

Moreover, it is preferable that the information processing apparatus 10 operates a thread controlling application 410, a control component 420, a judging component 430, a DLL 440, and a modifying component 450. The modifying component 450 modifies a call destination address of a function call from the thread controlling application 410 to the DLL 440 to an address of a control program realizing the control component 420. The thread controlling application 410 is an application program for controlling a thread. The thread controlling application 410 calls a function in the operating system 60 to control a thread when having received an instruction controlling the thread from a user. This function is provided by the DLL 440 in the operating system 60.

The control component 420 inhibits the process by which the thread controlling application 410 calls a function on the operating system 60 in order to terminate any thread. Specifically, the control component 420 is first called from the thread controlling application 410 to start a process. Then, the judging component 430 judges whether a function call calling the control component 420 from the thread controlling application 410 is a call of a process by which a thread realizing an modifying program is terminated. On condition that the function call is a call of the process terminating the thread, the control component 420 returns the process to the thread controlling application 410 without calling the DLL 440.

In this way, it is possible to prevent the termination of threads for realizing the modifying component 140, the modifying component 250, the modifying component 340, and the modifying component 450.

Figure 5:
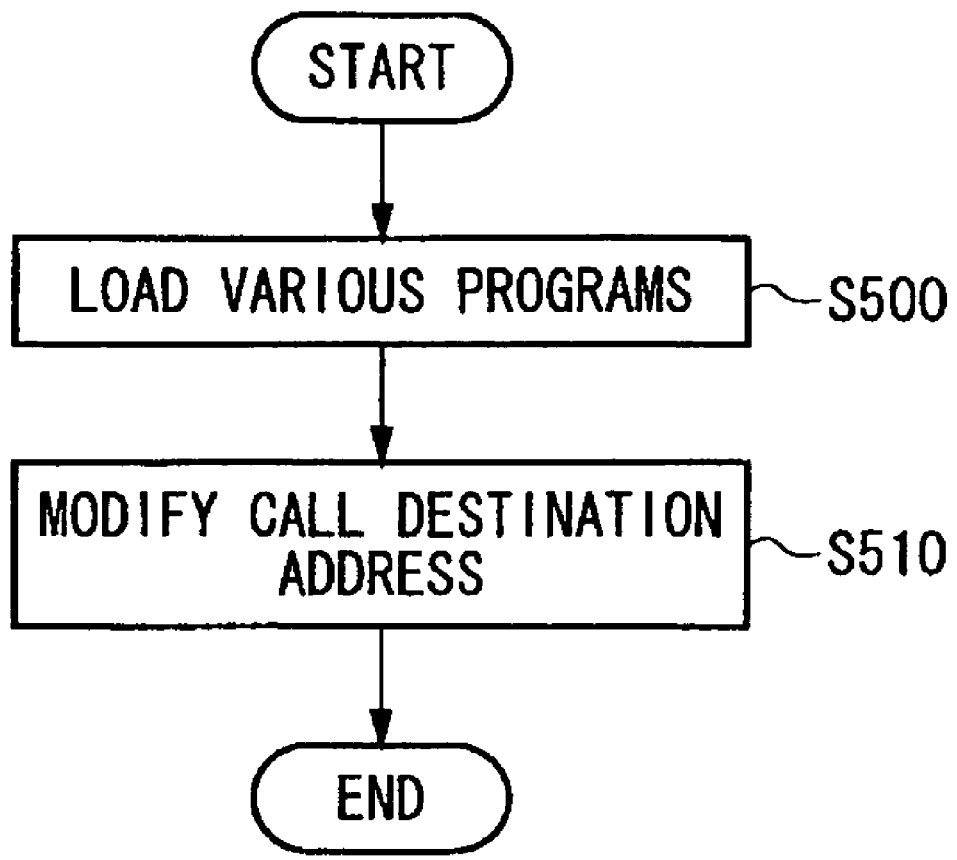
FIG. 5 is a flowchart showing overall operations of an information processing apparatus.

FIG. 5 is a flowchart showing overall operations of the information processing apparatus 10. The information processing apparatus 10 loads various types of programs such as a monitoring program and a control program into a memory space (S500). Specifically, the information processing apparatus 10 operates a monitoring program monitoring a function call from the application program 110 to the operating system 60, on the first memory space 100 along with the application program 110. By means of this monitoring program, the information processing apparatus 10 functions as the monitoring component 120. Moreover, the information processing apparatus 10 operates a control program inhibiting or modifying a function call from the application program 210 to the operating system 60 based on the monitoring result by the monitoring program, on the second memory space 200 along with the application program 210. By means of this control program, the information processing apparatus 10 functions as the control component 220. Moreover, the information processing apparatus 10 may operate a monitoring program monitoring a function call from the application starting program 310 to the operating system 60. Furthermore, the information processing apparatus 10 may operate a control program controlling a function call from the thread controlling application 410 to the operating system 60.

In order to load a control program and a monitoring program into a memory space, for example, it is preferable to register object files (e.g., DLL) of these programs as the standard DLL of an operating system. As an example, since Windows (a registered trademark) registers these programs in a registry as an USER32 extended DLL, these programs can be loaded when starting all processes that link USER32.DLL. In the present embodiment, for example, the policy manager 50 may register these programs in a registry as an USER32 extended DLL. Moreover, a system administrator may manually modify a registry.

Next, the information processing apparatus 10 operates the modifying programs (S510). The information processing apparatus 10 functions as the modifying component 140, the modifying component 250, the modifying component 340, and the modifying component 450 by means of the modifying programs. The modifying component 140 modifies a call destination address of a function call from the application program 110 to the operating system 60 to an address of the monitoring program realizing the monitoring component 120. The modifying component 250 modifies a call destination address of a function call from the application program 210 to the operating system 60 to an address of the control program realizing the control component 220, according to an operation start of the application program 210. The modifying component 340 modifies a call destination address of a function call from the application starting program 310 to the DLL 330 to an address of the monitoring program realizing the monitoring component 320. The modifying component 450 modifies a call destination address of a function call from the thread controlling application 410 to the DLL 440 to an address of the control program realizing the control component 420.

An example of a process modifying a call destination address of a function call will be described with reference to the modifying component 140 as a representative of the modifying component 140, the modifying component 250, the modifying component 340, and the modifying component 450. The modifying component 140 will back up a leading instruction code of a part in the DLL 130 called from the application program 110 in another area. Then, the modifying component 140 rewrites the instruction code into a jump instruction of the monitoring program realizing the monitoring component 120. Furthermore, the modifying component 140 calls the backed up leading instruction code from the monitoring component 120 in place of the process calling the DLL 130 from the monitoring component 120. It is desirable that this process is performed after stopping other threads in order that instruction codes are not executed in a transient state where this process is running.

Subsequently, details of a process of the information processing apparatus 10 will be described using a process in which the application program 110 copies data into the application program 210 via a clipboard. This process is realized by a combination of a first lower-level function in which the application program 110 records data in a clipboard and a second lower-level function in which the application program 210 reads data from the clipboard. First, the application program 110 calls the DLL in the operating system 60 in order to realize the first lower-level function. First, it will be explained about this process.

Figure 6:
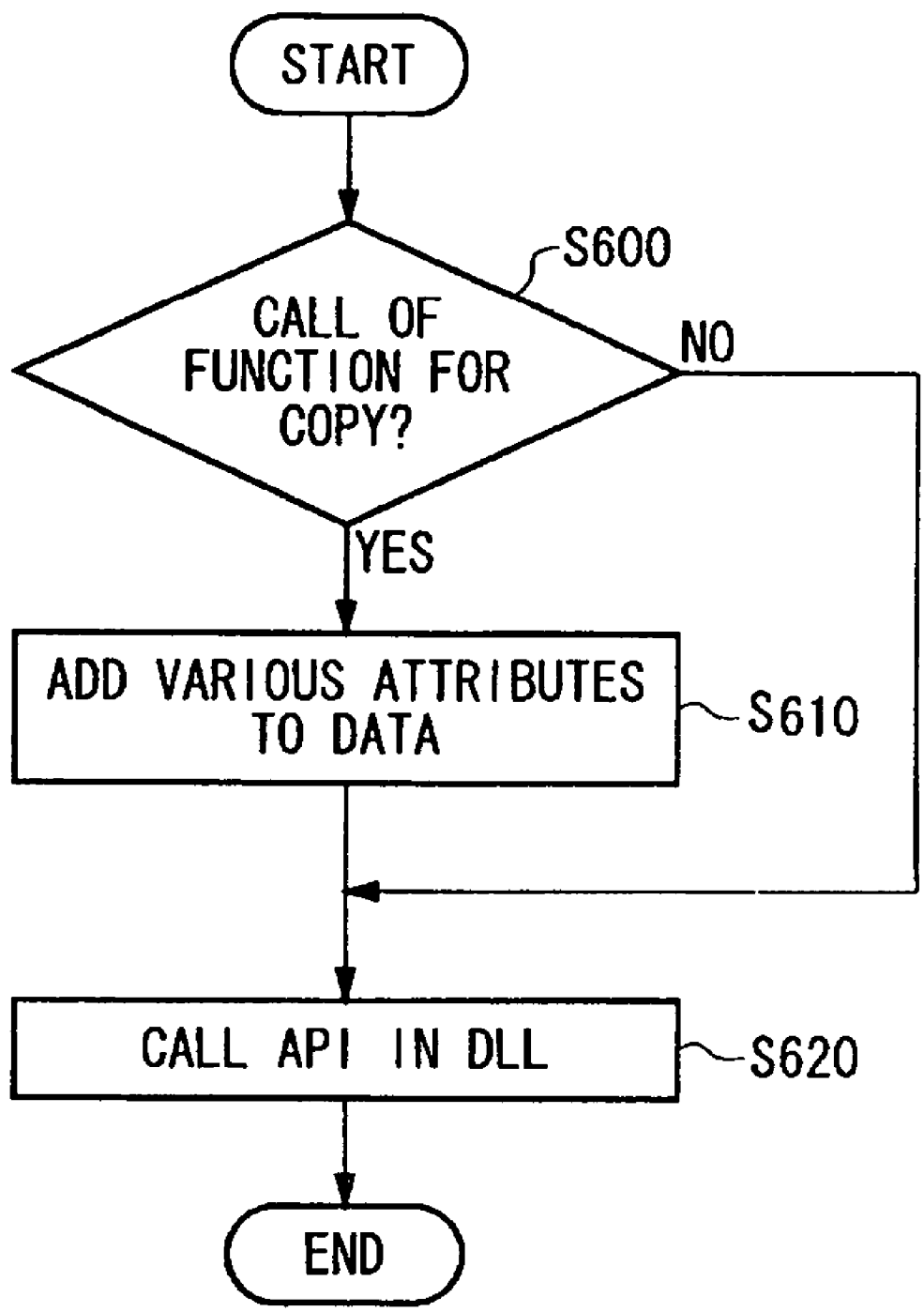
FIG. 6 is a flowchart of an application program and a monitoring component.

FIG. 6 is a flowchart of the application program 110 and the monitoring component 120. The monitoring component 120 judges whether a function call by the application program 110 is a call of a function for copy copying data into the shared memory space 150 after being called from the application program 110 to start its process (S600). On condition that the function call is a call of a function for copy (S600: YES), the monitoring component 120 adds various types of attributes to data to be copied. For example, the monitoring component 120 may add a digital watermark showing that the data has been copied from the application program 110.

Then, the monitoring component 120 calls API in the DLL 130 based on an argument called from the application program 110 (S620). For example, the monitoring component 120 may generate new data by adding identification information of the application program 110 to data designated by the application program 110 as an argument, and hand the new data to a function in the DLL 130 as an argument.

Figure 7:
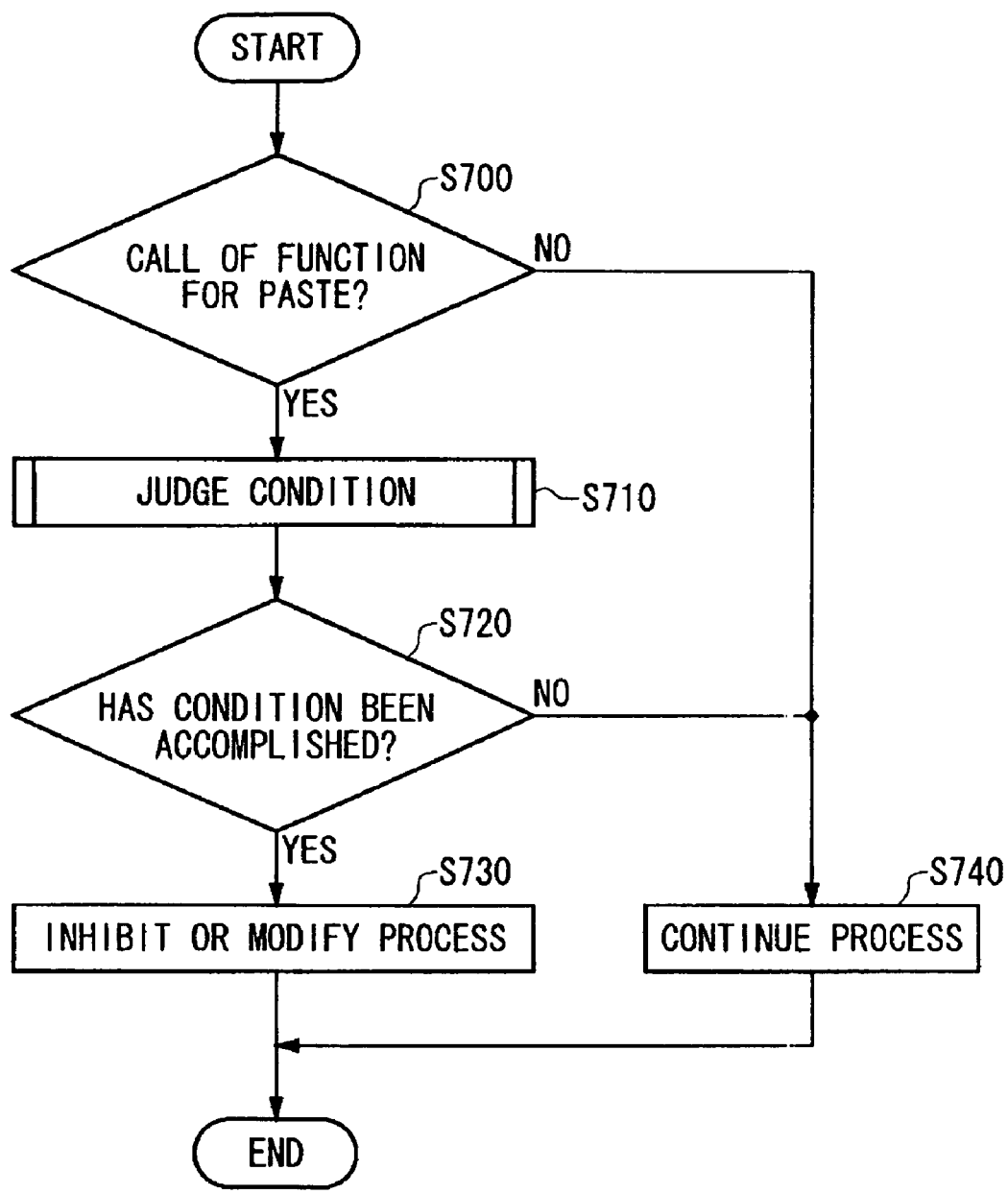
FIG. 7 is a flowchart of an application program, a control component, and a judging component.

Next, the application program 210 calls the DLL in the operating system 60 in order to realize the second lower-level function. It will be below described about this process. FIG. 7 is a flowchart of the application program 210, the control component 220, and the judging component 230. When the control component 220 has detected a call of a function through which the application program 210 reads data from the shared memory space 150, the control component 220 modifies or inhibits a process for that function call based on the judgment by the judging component 230. Hereinafter, a specific example will be described. The control component 220 judges whether the function call is a call of a function (a function for paste) through which the application program 210 reads data from the shared memory space 150 when being called from the application program 210 to start its process (S700).

If the function call is a call of a function for paste, it becomes clear that a combination of the first and second lower-level functions realized by the application programs 110 and 210 is a predetermined combination. That is to say, it is found that the functions realized by the application programs 110 and 210 are a combination of the first lower-level function recording data in a clipboard and the second lower-level function reading data from the clipboard. For this reason, if the function call is a call of a function for paste (S700: YES), the control component 220 calls the judging component 230 to make the judging component 230 judge whether the function may be executed or not. On condition that data recorded on the shared memory space 150 satisfies a condition for a data type for which a copy is inhibited, the judging component 230 judges that the copy of that data is inhibited (S710).

Subsequently, the control component 220 modifies or inhibits a process of the function call through which the application program 210 reads data from the shared memory space 150 based on the judgment by the judging component 230. Specifically, when a condition for inhibiting a function call has been accomplished (S720: YES), the control component 220 inhibits or modifies a process through which the application program 210 reads data from the shared memory space 150 (S730). For example, the control component 220 may return an error code to the application program 210 without calling a function in the DLL 240. In other words, the control component 220 may return null data to the application program 210 without calling a function in the DLL 240.

On the other hand, when the function call is not a call of a function for paste or a condition for inhibiting a function call is not accomplished (S720: NO), the control component 220 continues the process through which the application program 210 reads data from the shared memory space 150 (S740). For example, the control component 220 may designate the argument designated from the application program 210 as it is as an argument to call a function in the DLL 240.

Figure 8:
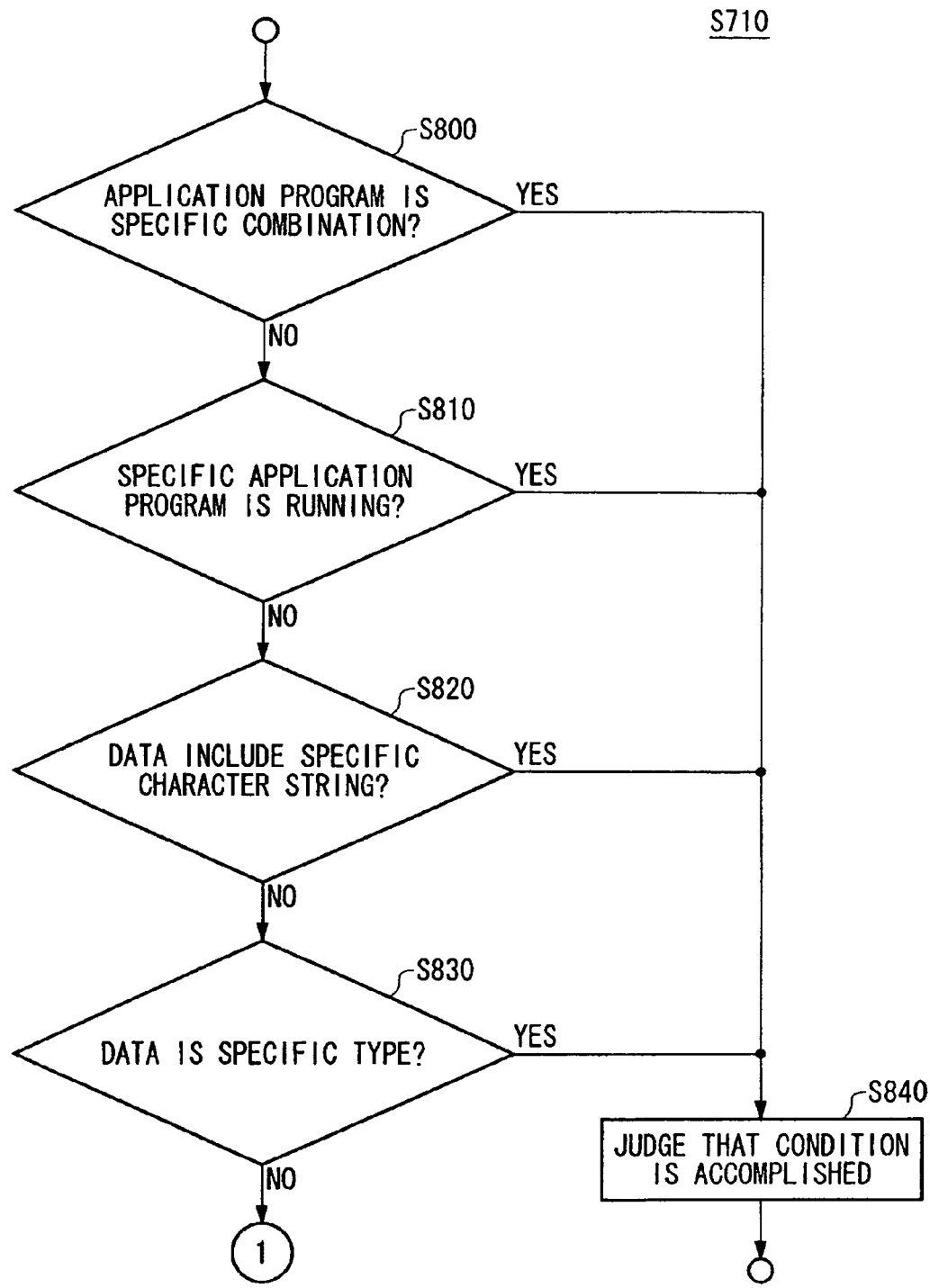
FIG. 8 is a flowchart showing details of a process in S710 (the first drawing of two drawings)

FIG. 8 is a flowchart showing details of a process in S710 (the first drawing of two drawings). The judging component 230 judges whether a set of the application program 110 identified by the identification information acquired from the shared memory space 150 and the monitoring component 120 is identical with a set of the application programs recorded on the recording section 55 (S800). When the two sets are identical with each other (S800: YES), it is judged that the copy of data is inhibited between the application program 110 and the monitoring component 120 (S840). In this way, it is possible to inhibit a copy from an application program, which handles an enormous amount of data such as a CAD tool in large quantities, to an application program, which communicates with an outside such as a mailer.

Moreover, on condition that an application program identified by the identification information showing a running application program, which is acquired from the shared memory space 150, is a predetermined specific application program (S810: YES), the judging component 230 judges that copying the data recorded in the shared memory space 150 into the application program 210 is inhibited (S840). For example, when an application program such as a mailer communicating with an outside apparatus is running, a copy can be completely inhibited.

Moreover, on condition that data recorded in the shared memory space 150 includes a specific character string for which the copy is inhibited (S820: YES), the judging component 230 judges that copying the data recorded in the shared memory space 150 into the application program 210 is inhibited (S840). For example, when including a character string such as "confidential" or "secret", it is judged that it is necessary to prevent leakage to other people and thus the copy is inhibited.

Moreover, on condition that data recorded in the shared memory space 150 satisfies a condition for a data type for which a copy is inhibited (S830: YES), the judging component 230 judges that the copy of that data is inhibited (S840). For example, the judging component 230 first judges a type of data based on a file format of the data recorded in the shared memory space 150. The judging component 230 may judge that the file stores a document therein, for example, if extension of the file is "doc" or the like.

Then, on condition that the judged type of data is a predetermined specific type, the judging component 230 judges that the copy of that data is inhibited. For example, on condition that the data is information with high confidentiality such as design information by a CAD tool, the judging component 230 may judge that the copy of data is inhibited.

Figure 9:
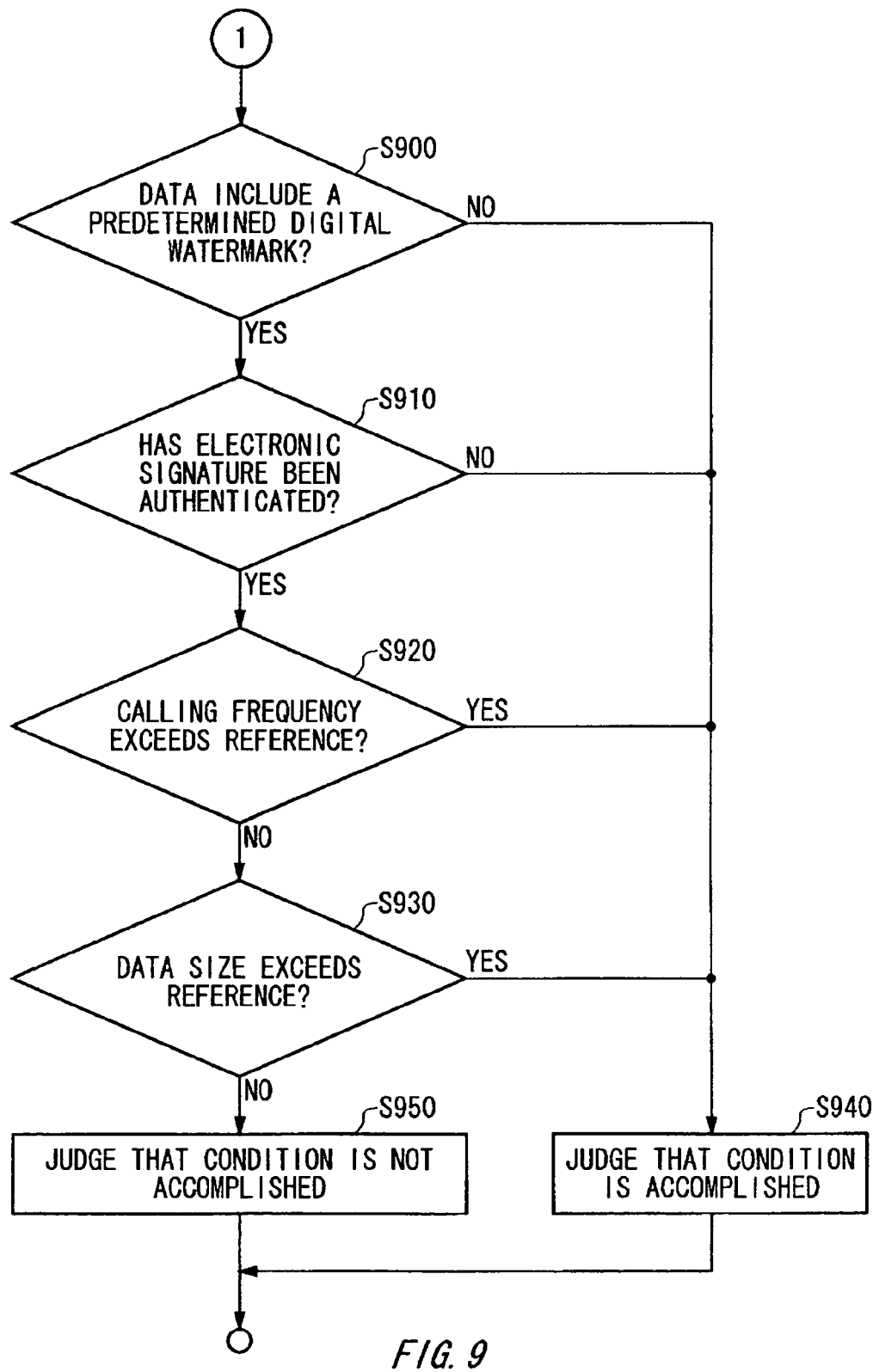
FIG. 9 is a flowchart showing details of a process in S710 (the second drawing of two drawings)

FIG. 9 is a flowchart showing details of a process in S710 (the second drawing of two drawings). On condition that the data does not include a predetermined digital watermark (S900: NO), the judging component 230 judges that the copy of data is inhibited (S940). In this way, it is possible to inhibit data from being copied from applications other than a specific application to which a digital watermark is added and prevent operations of the application program 210 from being blocked by data of unknown origin (e.g., a computer virus or the like).

Moreover, the judging component 230 authenticates an electronic signature recorded in the shared memory space 150 (S910). When data recorded in the shared memory space 150 is encoded, the judging component 230 may decode the data. On condition that authentication or decryption fails (S910: NO), the judging component 230 judges that the copy of data recorded in correspondence with the electronic signature is inhibited (S940). On condition that authentication by the judging component 230 has succeeded (S900: YES), the control component 220 permits a function call by the application program 210 if the following other conditions are not accomplished. In this way, for example, the application program 210 can read data from the shared memory space 150.

Moreover, on condition that the number of times of the function call through which data is recorded in the shared memory space 150 has exceeded a predetermined reference (S920: YES), the judging component 230 judges that the copy of data is inhibited (S940). Moreover, on condition that the size of data recorded in the shared memory space 150 has exceeded a predetermined reference (S930: YES), the judging component 230 judges that the copy of data is inhibited (S940). In this way, it is possible to limit an amount of data to be copied to reduce the risk of information leakage.

When any conditions described above are not satisfied (S930: NO), the judging component 230 judges that a condition for inhibiting a copy of data recorded in the shared memory space 150 is not satisfied (S950) and permits the copy of that data.

As above, according to a process of the present drawing, it is possible to finely control a copy of data between application programs without remodeling an operating system. In this way, it is possible to beforehand prevent leakage of confidential data and thus raise safety of a system. In addition, a process of the present drawing is an example. Thus, a condition for inhibiting a copy of data may be modified by the policy manager 50. That is to say, a system administrator can control operations of an application program in the information processing apparatus 10 by operating the policy manager 50.

Figure 10:
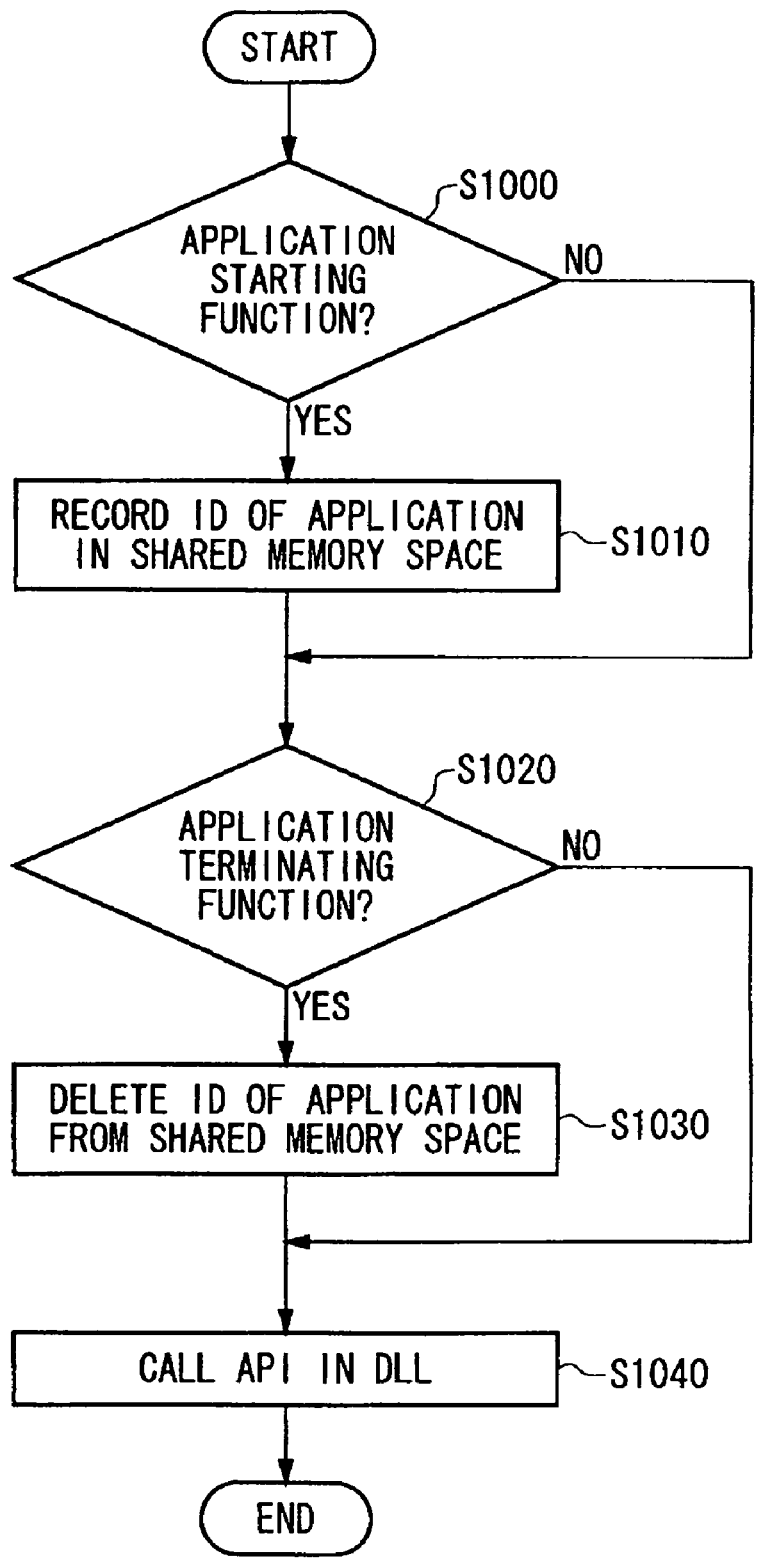
FIG. 10 is a flowchart of an application starting program and a monitoring component.

FIG. 10 is a flowchart of the application starting program 310 and the monitoring component 320. The monitoring component 320 is called from the application starting program 310 to start a process, and then judges whether a function call by the application starting program 310 is a call of a function (a function for start) starting another application program (S 1000). On condition that the function call is a call of a function for start (S1000: YES), the monitoring component 320 records identification information of the application program started by the function call in the shared memory space 150 (S1010).

Moreover, the monitoring component 320 judges whether a function call by the application starting program 310 is a call of a function (a function for termination) for terminating other application programs (S1020). On condition that the function call is a call of a function for termination (S1020: YES), identification information of the application program terminated by the function call is deleted from the shared memory space 150 (S1030). Then, the monitoring component 320 calls the DLL 330 to really control the application program (S1040).

Here, the operating system 60 provides a plurality of functions for termination according to the difference between methods terminating the application programs. For this reason, in order to appropriately manage the running application program, even if the application program is terminated by any function for termination, the termination of the application program must be detected. Therefore, although any function for termination is called in place of the function for termination, the monitoring component 320 may monitor a specific function called by the termination use function. This specific function is, e.g., a function that opens up the DLL read by the application program from a memory space. It is possible to rightly manage the running application program by monitoring a call for this function.

Figure 11:
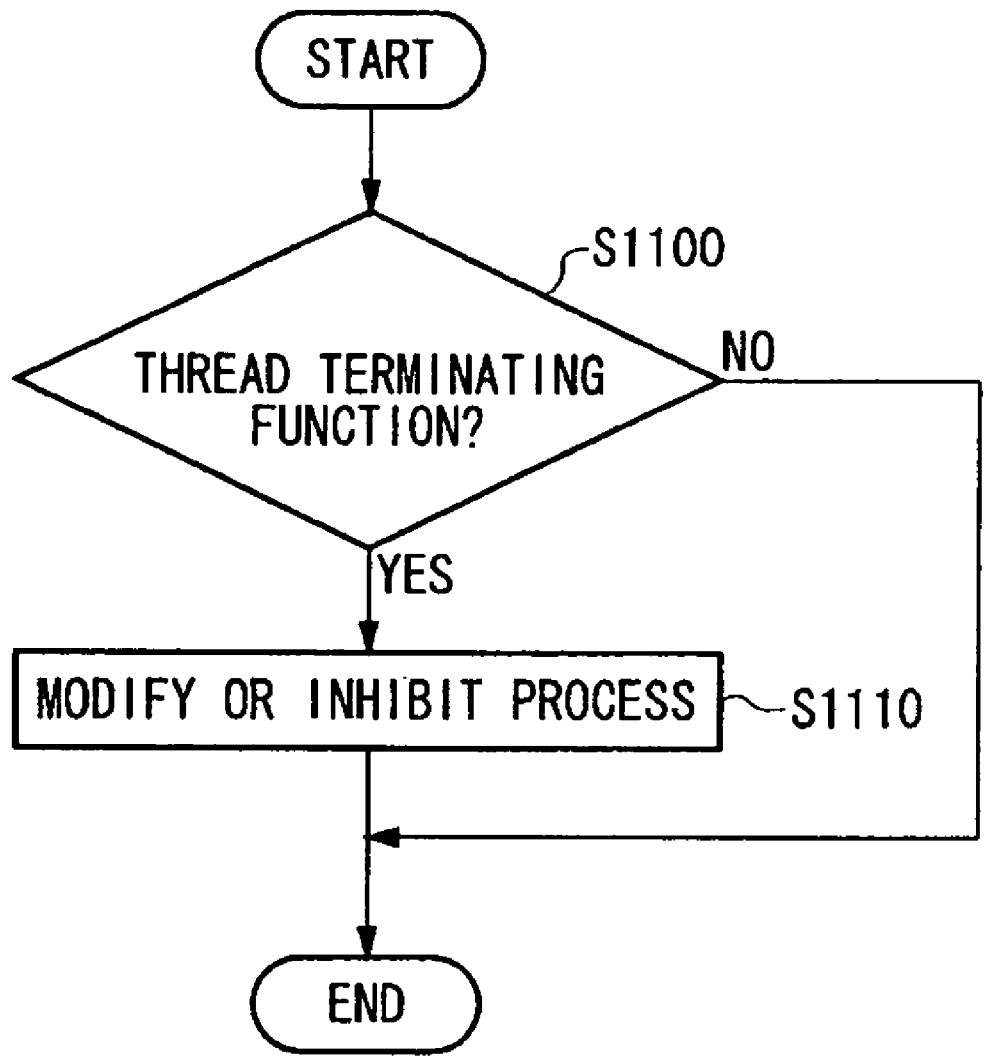
FIG. 11 is a flowchart of a thread controlling application, a control component, and a judging component.

FIG. 11 is a flowchart of the thread controlling application 410, the control component 420, and the judging component 430. The control component 420 starts a process called from the thread controlling application 410, and then judges whether a function call by the thread controlling application 410 is a call of a function for terminating other threads (S1100). On condition that the function call is a call of a function for terminating other threads (S1100:YES), the control component 420 modifies or inhibits a process for the function (S1110). For example, the control component 420 may return an error code to the thread controlling application 410 without terminating the thread.

Figure 12:
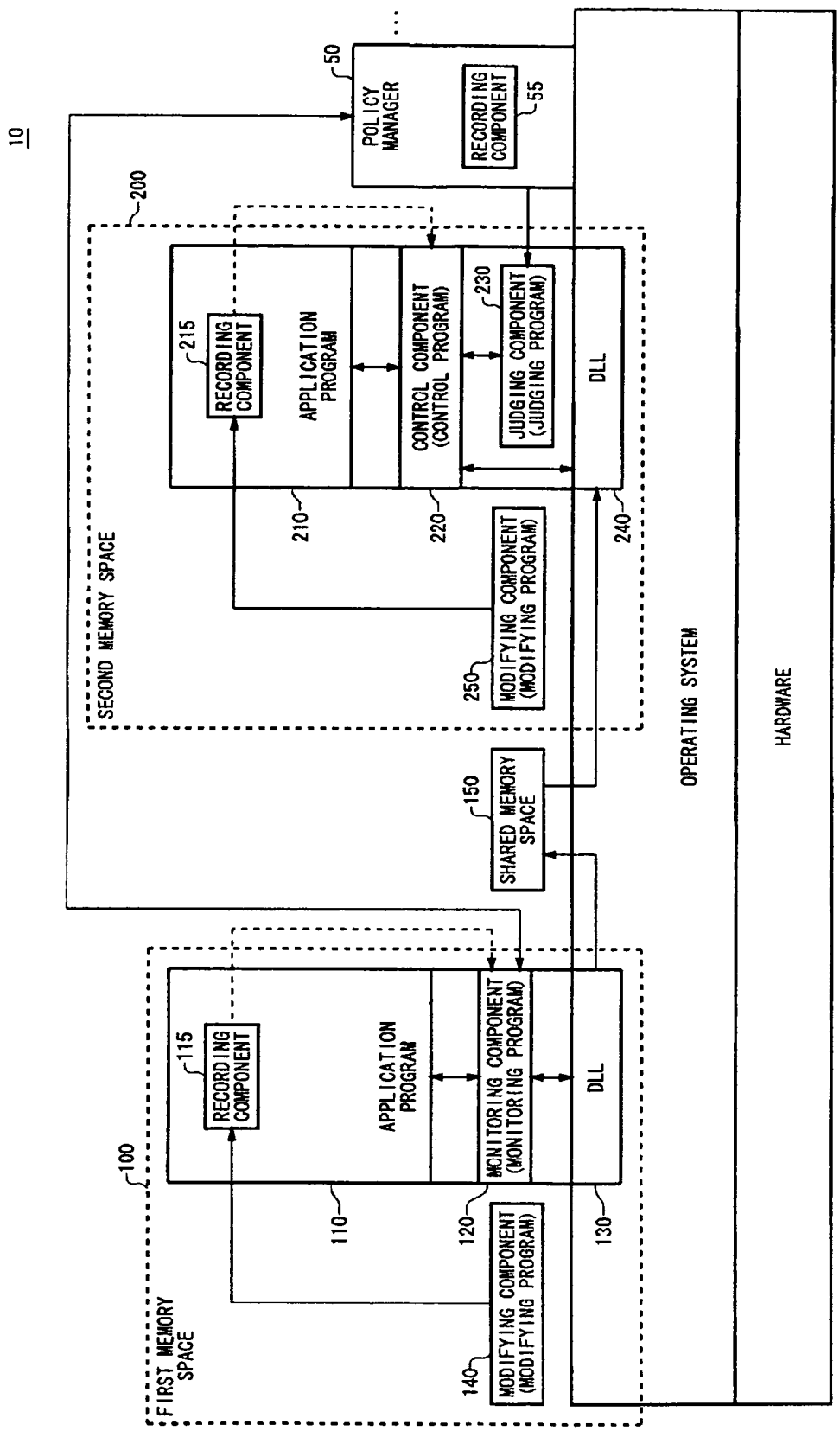
FIG. 12 is a view showing an alternative example of a configuration of an information processing apparatus.

FIG. 12 is a view showing a configuration of an information processing apparatus 10 according to an alternative example. In the present alternative example, an application program 110 has a recording section 115 that is an example of a first recording section according to the present invention. In Windows (a registered trademark) operating system, the recording section 115 is referred to as, e.g., an import address table. The recording section 115 is referred to from the application program 110 every function call, and records a call destination address of each function in association with identification information of that function. That is to say, for example, when a certain function is called, the application program 110 retrieves a call destination address of the function from the recording section 115 by means of identification information of the function. Then, the function is called by moving a process to the retrieved call destination address. Moreover, a second memory space 200 similarly has a recording section 215. The recording section 215 records a call destination address referred to from an application program 210.

Moreover, a modifying component 140 according to the present alternative example modifies a call destination of a function by rewriting the recording section 115. Specifically, the modifying component 140 modifies a call destination address recorded on the recording section 115 in correspondence with a function preset as an object monitoring processing matter to an address of a monitoring program realizing a monitoring component 120. Similarly, a modifying component 250 according to the present alternative example modifies a call destination address recorded on the recording section 215 in correspondence with a function preset as an object controlling a process to an address of a control program realizing a control component 220. In addition, since other configurations are generally same as members of the same symbols shown in FIG. 1, their descriptions will be omitted. In this manner, even in a configuration shown in the present alternative example, it is possible to monitor or control a function call from an application program to an operating system.

Figure 13:
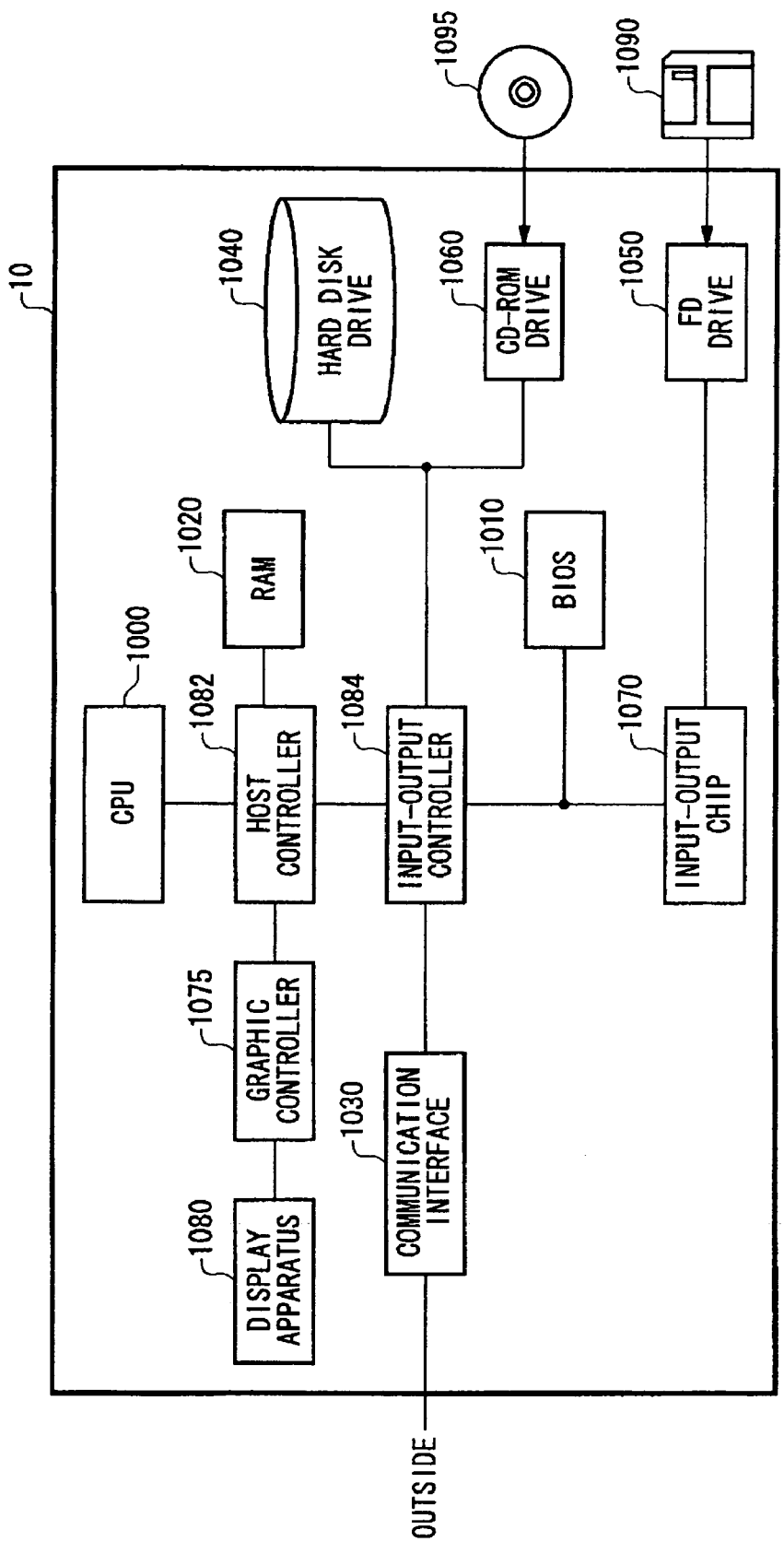
FIG. 13 is a view exemplary showing a hardware configuration of an information processing apparatus.

FIG. 13 is a view exemplary showing a hardware configuration of the information processing apparatus 10. The information processing apparatus 10 includes a CPU peripheral section having a CPU 1000, a RAM 1020, and a graphic controller 1075 that are connected to one another by a host controller 1082, an input-output section having a communication interface 1030, a hard disk drive 1040, and a CD-ROM drive 1060 that are connected to the host controller 1082 by an input-output controller 1084, and a legacy input-output section having a BIOS 1010, a flexible disk drive 1050, and an input-output chip 1070 that are connected to the input-output controller 1084.

The host controller 1082 connects the RAM 1020 to the CPU 1000 and the graphic controller 1075 for accessing the RAM 1020 at high transfer rate. The CPU 1000 operates based on a program stored on the BIOS 1010 and the RAM 1020 to control each section. The graphic controller 1075 acquires image data generated by the CPU 1000 on a frame buffer provided in the RAM 1020, and displays the data on the display apparatus 1080. Alternatively, the graphic controller 1075 may include therein the frame buffer storing the image data generated from the CPU 1000.

The input-output controller 1084 connects the host controller 1082 to the communication interface 1030, the hard disk drive 1040, and the CD-ROM drive 1060 that are a comparatively fast input-output apparatus. The communication interface 1030 communicates with outside apparatuses via a network. The hard disk drive 1040 stores a program and data to be used by the information processing apparatus 10. The CD-ROM drive 1060 reads a program or data from a CD-ROM 1095, and provides the program or data to the RAM 1020 or the hard disk drive 1040.

Moreover, the RAM 1020 includes the first memory space 100, the second memory space 200, and the shared memory space 150. That is to say, the application program 110 is read into the first memory space 100 in the RAM 1020 to be executed by the CPU 1000. Moreover, the application program 210 is read into the second memory space 200 in the RAM 1020 to be executed by the CPU 1000. Moreover, the application program 110 is executed by the CPU 1000 to generate data and records the data in the shared memory space 150 in the RAM 1020.

Moreover, the BIOS 1010, the flexible disk drive 1050, and the input-output chip 1070 that are a comparatively low-speed input-output apparatus are connected to the input-output controller 1084. The BIOS 1010 stores a boot program to be executed by the CPU 1000 during starting the information processing apparatus 10, a program dependent on hardware of the information processing apparatus 10, or the like. The flexible disk drive 1050 reads a program or data from a flexible disk 1090, and provides the program or data to the RAM 1020 or the hard disk drive 1040 via the input-output chip 1070. The input-output chip 1070 connects various kinds of input-output apparatuses via the flexible disk 1090, a parallel port, a serial port, a keyboard port, a mouse port, or the like.

A program provided to the information processing apparatus 10 is stored on a recording medium such as the flexible disk 1090, the CD-ROM 1095, or an IC card in order to be provided by a user. The program is read from the recording medium via the input-output chip 1070 and the input-output controller 1084 to be installed and executed in the information processing apparatus 10. Since operations performed by working on the information processing apparatus 10 or the like by the program are the same as those by the information processing apparatus 10 described in FIGS. 1 to 12, their descriptions will be omitted.

A program described above may be stored on an outside storage medium. A storage medium can include an optical recording medium such as a DVD and a PD, a magneto-optical recording medium such as an MD, a tape medium, a semiconductor memory such as an IC card in addition to the flexible disk 1090 and the CD-ROM 1095. Moreover, a storage device such as a hard disk or RAM provided in a server system connected to a private communication network and Internet may be used as a recording medium to provide a program to the information processing apparatus 10 via a network.

Figure 14:
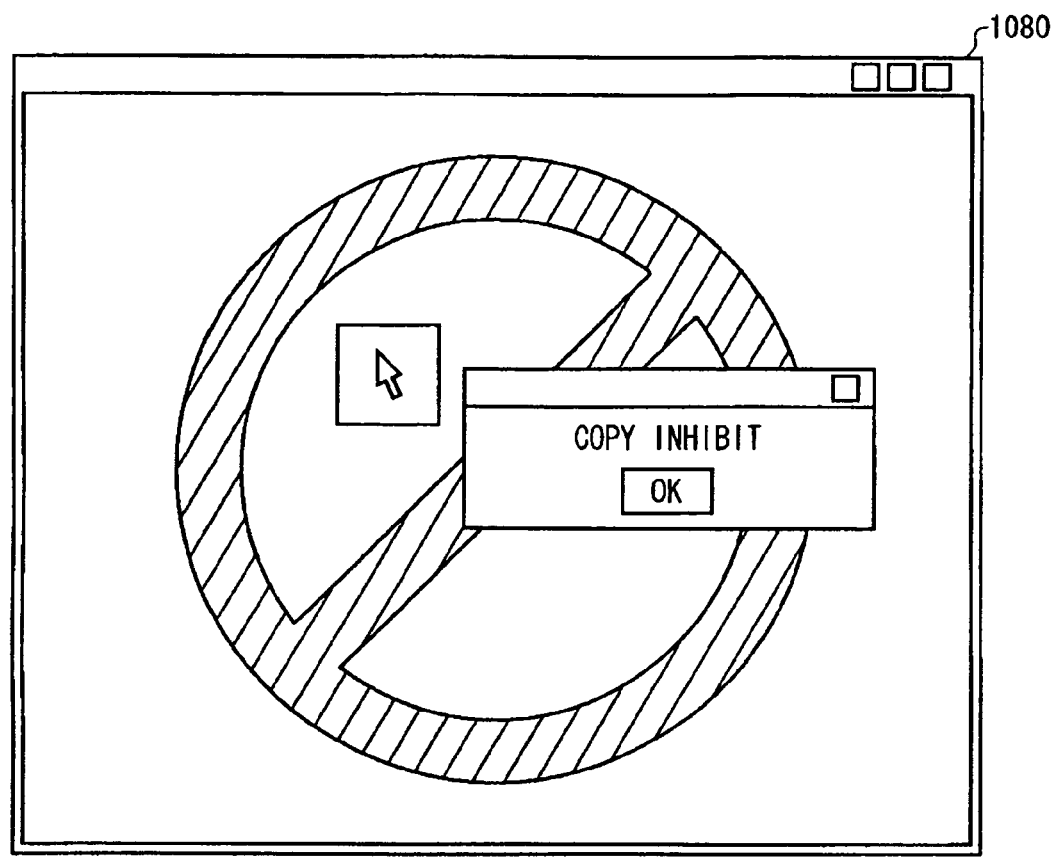
FIG. 14 is a view showing a display example of a display section.

FIG. 14 shows a display example of the display section 1080. As shown in the present drawing, when the copy of data is inhibited by the control component 220, the information processing apparatus 10 displays a message or a symbol showing that effect on an operation screen for the application program 210 in the display section 1080. For example, the information processing apparatus 10 may pop up a message of "copy inhibit" on a window that is an operation screen for the application program 210. This message may be an error message that has been previously prepared by the application program 210. That is to say, such a display can be realized only by the control component 220 returning an error code to the application program 210 without changing the existing application program 210.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

The invention claimed is:

1. A control method of an application program in an information processing apparatus that operates an operating system, and operates a plurality of application programs including first and second application programs on the operating system in parallel, comprising:
running the first application program in a first memory space;
running the second application program in a second memory space, which is different from the first memory space;
recording a set of application programs in which copying data between the application programs is prohibited;
running a monitoring program, which runs along with the first application program in the first memory space;
detecting a function call to record the data to a shared memory space;
accessing a memory space that is capable of being accessed by either of the first and second application programs from the first application program to the operating system;
indicating by a digital watermark that the data is copied from the first application program;
running a judgment program on the information processing apparatus to determine that the function call reads data from the shared memory space;
inhibiting data from being copied such that the data recorded in the shared memory space does not include the digital watermark; and
running a control program on the information processing apparatus to inhibit and modify the function call;
detecting a function to read data from the shared memory space, from the second application program to the operating system such that copying data is inhibited;
recording identification information for identifying the first application program into the shared memory space, which is a memory space accessible by both the monitoring program and the control program, in response to the detection of a call of the function to record data into the shared memory space by the first application program; and
judging that copying the data is inhibited such that a set of the application programs to be identified by the identification information acquired from the control memory space and the second application program is matched with a set of the application programs recorded in a recording section.

* * * * *